United States Patent
Kamrath et al.

(10) Patent No.: US 10,563,520 B2
(45) Date of Patent: Feb. 18, 2020

(54) TURBINE COMPONENT WITH SHAPED COOLING PINS

(71) Applicant: HONEYWELL INTERNATIONAL INC., Morris Plains, NJ (US)

(72) Inventors: Benjamin Dosland Kamrath, Canby, MN (US); Jason Smoke, Phoenix, AZ (US); Daniel C. Crites, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 653 days.

(21) Appl. No.: 15/475,597

(22) Filed: Mar. 31, 2017

(65) Prior Publication Data

US 2018/0283182 A1    Oct. 4, 2018

(51) Int. Cl.
F01D 5/18    (2006.01)

(52) U.S. Cl.
CPC .............. *F01D 5/187* (2013.01); *F01D 5/18* (2013.01); *F05D 2220/323* (2013.01); *F05D 2240/30* (2013.01); *F05D 2250/18* (2013.01); *F05D 2250/60* (2013.01); *F05D 2260/20* (2013.01); *F05D 2260/2212* (2013.01); *F05D 2260/22141* (2013.01); *F05D 2260/607* (2013.01); *Y02T 50/676* (2013.01)

(58) Field of Classification Search
CPC . F01D 5/18; F01D 5/186; F01D 5/187; F01D 5/188; F05D 2260/2141; F05D 2260/607
See application file for complete search history.

(56) References Cited

U.S. PATENT DOCUMENTS

| 6,599,092 B1* | 7/2003 | Manning | F01D 5/187 415/115 |
| 7,097,425 B2* | 8/2006 | Cunha | F01D 5/186 415/115 |
| 7,125,225 B2* | 10/2006 | Surace | F01D 5/16 416/96 R |
| 7,625,178 B2 | 12/2009 | Morris et al. | |
| 8,353,669 B2* | 1/2013 | Chon | F01D 5/187 416/193 A |
| 8,506,252 B1 | 8/2013 | Liang | |

(Continued)

OTHER PUBLICATIONS

Extended EP Search Report for Application No. 18163803.2 dated Sep. 5, 2018.
Cohen, J. and Bourell, D.L., "Development of Novel Tapered Pin Fin Geometries for Additive Manufacturing of Compact Heat Exchangers," Proc. of the 27th Annual International Solid Freeform Fabrication Symposium, Nov. 2016, pp. 2314-2336.

(Continued)

*Primary Examiner* — Dwayne J White
*Assistant Examiner* — Jackson N Gillenwaters
(74) *Attorney, Agent, or Firm* — Lorenz & Kopf, LLP

(57) ABSTRACT

A turbine component with shaped cooling pins is provided. The turbine component includes at least one cooling circuit defined within the turbine component, the at least one cooling circuit in fluid communication with a source of a cooling fluid. The turbine component includes at least one shaped cooling pin disposed in the at least one cooling circuit. The at least one shaped cooling pin has a first end and a second end extending along an axis. The first end has a first curved surface defined by a minor diameter and the second end has a second curved surface defined by a major diameter. The first curved surface is upstream in the cooling fluid and the minor diameter is less than the major diameter.

17 Claims, 6 Drawing Sheets

(56) References Cited

U.S. PATENT DOCUMENTS

| | | | | |
|---|---|---|---|---|
| 8,807,945 | B2* | 8/2014 | Spangler | F01D 5/187 |
| | | | | 416/97 R |
| 9,181,808 | B2* | 11/2015 | Carter | F01D 5/187 |
| 9,879,546 | B2* | 1/2018 | Hudson | F01D 5/186 |
| 10,060,267 | B2* | 8/2018 | Lutjen | F01D 5/187 |
| 2011/0033311 | A1 | 2/2011 | Martin et al. | |
| 2012/0207591 | A1 | 8/2012 | Lee et al. | |
| 2012/0269649 | A1 | 10/2012 | Rawlings et al. | |
| 2013/0236326 | A1* | 9/2013 | Duong | F01D 5/14 |
| | | | | 416/236 R |
| 2014/0110559 | A1 | 4/2014 | Lee et al. | |
| 2016/0177739 | A1* | 6/2016 | Ahmad | F01D 5/187 |
| | | | | 416/95 |
| 2017/0009589 | A1* | 1/2017 | Gupta | F01D 5/147 |
| 2017/0248021 | A1* | 8/2017 | Auxier | F01D 25/12 |

OTHER PUBLICATIONS

Manikandan, C. and S. Pachaiyappan, "Investigation of Heat Transfer Characteristics in a Rectangular Channel with Perforated Drop Shaped Pin Fins," International Journal of Scientific & Engineering Research, vol. 7, Issue 5, May 2016.

Chyu, Minking K. and Sin Chien Siw, "Recent Advances of Internal Cooling Techniques for Gas Turbine Airfoils," Journal of Thermal Science and Engineering Applications, vol. 5, Issue 2, May 17, 2013.

Han, Je-Chin, Sandip Dutta and Srinath Ekkad, Gas Turbine Heat Transfer and Cooling Technology, published by Taylor & Francis, 2000, p. 388-389.

Niabati, Optimal Pin Fin Heat Exchanger Surface, Mälardalen University Press Licentiate Theses, 2008, No. 88, Arkitektkopia, Västerås, Sweden.

* cited by examiner

TURBINE COMPONENT WITH SHAPED COOLING PINS

TECHNICAL FIELD

The present disclosure generally relates to gas turbine engines, and more particularly relates to a turbine component, such as a turbine airfoil, for use within a gas turbine engine that has one or more shaped cooling pins.

BACKGROUND

Gas turbine engines may be employed to power various devices. For example, a gas turbine engine may be employed to power a mobile platform, such as an aircraft, rotorcraft, etc. In the example of the gas turbine engine powering a mobile platform, certain operating environments, such as desert operating environments, may cause the gas turbine engine to ingest fine sand and dust particles. These ingested fine sand and dust particles may pass through portions of the gas turbine engine and may accumulate in stagnation regions of cooling circuits within turbine components, such as turbine airfoils, associated with the gas turbine engine. The accumulation of the fine sand and dust particles in the stagnation regions of the cooling circuits in the turbine components, such as the turbine airfoil, may impede the cooling of the turbine airfoil, which in turn, may reduce the life of the turbine airfoil leading to increased repair costs and downtime for the gas turbine engine.

Accordingly, it is desirable to provide a turbine component, such as a turbine airfoil, having one or more shaped cooling pins, which enable the cooling of the turbine component, such as a turbine airfoil, while reducing a stagnation region within the cooling circuit. Stated another way, it is desirable to provide the turbine airfoil having the one or more shaped cooling pins, which reduce the accumulation of fine sand and dust particles, thereby maintaining the cooling of the turbine airfoil in operating environments having fine sand and dust particles. Furthermore, other desirable features and characteristics of the present invention will become apparent from the subsequent detailed description and the appended claims, taken in conjunction with the accompanying drawings and the foregoing technical field and background.

SUMMARY

In various embodiments, a turbine component is provided. The turbine component includes at least one cooling circuit defined within the turbine component, the at least one cooling circuit in fluid communication with a source of a cooling fluid. The turbine component includes at least one shaped cooling pin disposed in the at least one cooling circuit. The at least one shaped cooling pin has a first end and a second end extending along an axis. The first end has a first curved surface defined by a minor diameter and the second end has a second curved surface defined by a major diameter. The first curved surface is upstream in the cooling fluid and the minor diameter is less than the major diameter.

Further provided is a turbine component. The turbine component includes at least one cooling circuit defined within the turbine component. The at least one cooling circuit is in fluid communication with a source of a cooling fluid. The turbine component includes a plurality of shaped cooling pins disposed in the at least one cooling circuit in a pattern that includes at least one row of a first sub-plurality of the plurality of shaped cooling pins and at least one column of a second sub-plurality of the plurality of shaped cooling pins. Each of the at least one row of the shaped cooling pins is spaced apart by a first distance, and each of the at least one column of the shaped cooling pins is spaced apart by a second distance. The first distance is different than the second distance. Each of the plurality of shaped cooling pins has a first end and a second end extending along an axis. The first end has a first curved surface defined by a minor diameter and the second end has a second curved surface defined by a major diameter. The second curved surface is downstream from the first curved surface in the cooling fluid and the minor diameter is less than the major diameter.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of turbine component that would benefit from one or more shaped cooling pins, and that the axial turbine airfoil described herein for use with a gas turbine engine is merely one exemplary embodiment according to the present disclosure. Moreover, while the turbine airfoil is described herein as being used with an axial turbine of a gas turbine engine onboard a mobile platform or vehicle, such as a bus, motorcycle, train, motor vehicle, marine vessel, aircraft, rotorcraft and the like, the various teachings of the present disclosure can be used with a gas turbine engine or with an axial or radial turbine associated with a stationary platform. In addition, the present disclosure may be employed in airfoils or other components for use within other applications that require cooling. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
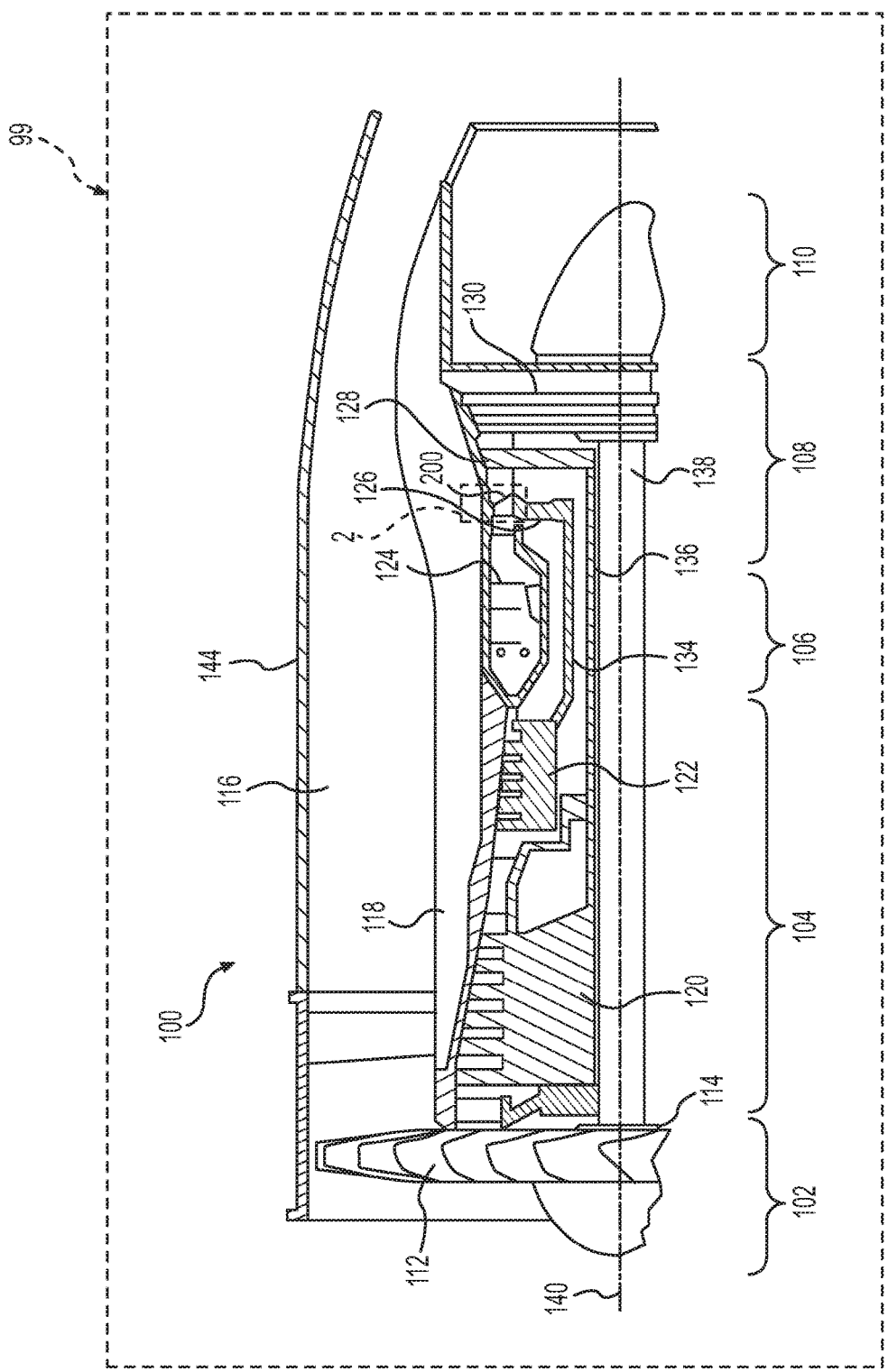
FIG. 1 is a schematic cross-sectional illustration of a gas turbine engine including an axial turbine having a turbine component, such as a turbine blade with a turbine airfoil having at least one shaped cooling pin according to the various teachings of the present disclosure.

With reference to FIG. 1, a partial, cross-sectional view of an exemplary gas turbine engine 100 is shown with the remaining portion of the gas turbine engine 100 being axi-symmetric about a longitudinal axis 140, which also comprises an axis of rotation for the gas turbine engine 100. In the depicted embodiment, the gas turbine engine 100 is an annular multi-spool turbofan gas turbine jet engine 100 within an aircraft 99, although other arrangements and uses may be provided. Alternatively, the gas turbine engine 100 may be an auxiliary power unit ("APU"). As will be discussed herein, an airfoil of one or more turbine blades 200 associated with the gas turbine engine 100 includes one or more shaped cooling pins within an internal cooling circuit, which aid in cooling the airfoil. By employing the one or more shaped cooling pins, a stagnation region is reduced within the internal cooling circuit, thereby reducing an accumulation of fine sand and dust particles. By reducing the accumulation of fine sand and dust particles, the cooling of the turbine airfoil of the turbine blade is maintained, even in operating environments that include fine sand and dust particles.

In this example, the gas turbine engine 100 includes a fan section 102, a compressor section 104, a combustor section 106, a turbine section 108 and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes a low pressure compressor 120 and a high pressure compressor 122. However, in other embodiments, the number of compressors in the compressor section 104 may vary. In the depicted embodiment, the low pressure compressor 120 and the high pressure compressor 122 sequentially raise the pressure of the air and direct a majority of the high pressure air into the combustor section 106. A fraction of the compressed air bypasses the combustor section 106 and is used as a source of cooling fluid or air to cool other components, in this example, the turbine airfoil of the one or more turbine blades 200 in the turbine section 108.

In the embodiment of FIG. 1, in the combustor section 106, which includes a combustion chamber 124, the high pressure air is mixed with fuel and combusted. The high-temperature combusted air is then directed into the turbine section 108. In this example, the turbine section 108 includes three turbines disposed in axial flow series, namely, a high pressure turbine 126, a low pressure turbine 128, and a power turbine 130. However, it will be appreciated that the number of turbines, and/or the configurations thereof, may vary. In this embodiment, the high-temperature combusted air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a shaft 134, the low pressure turbine 128 drives the low pressure compressor 120 via a shaft 136, and the power turbine 130 drives the fan 112 via a shaft 138.

Figure 2:
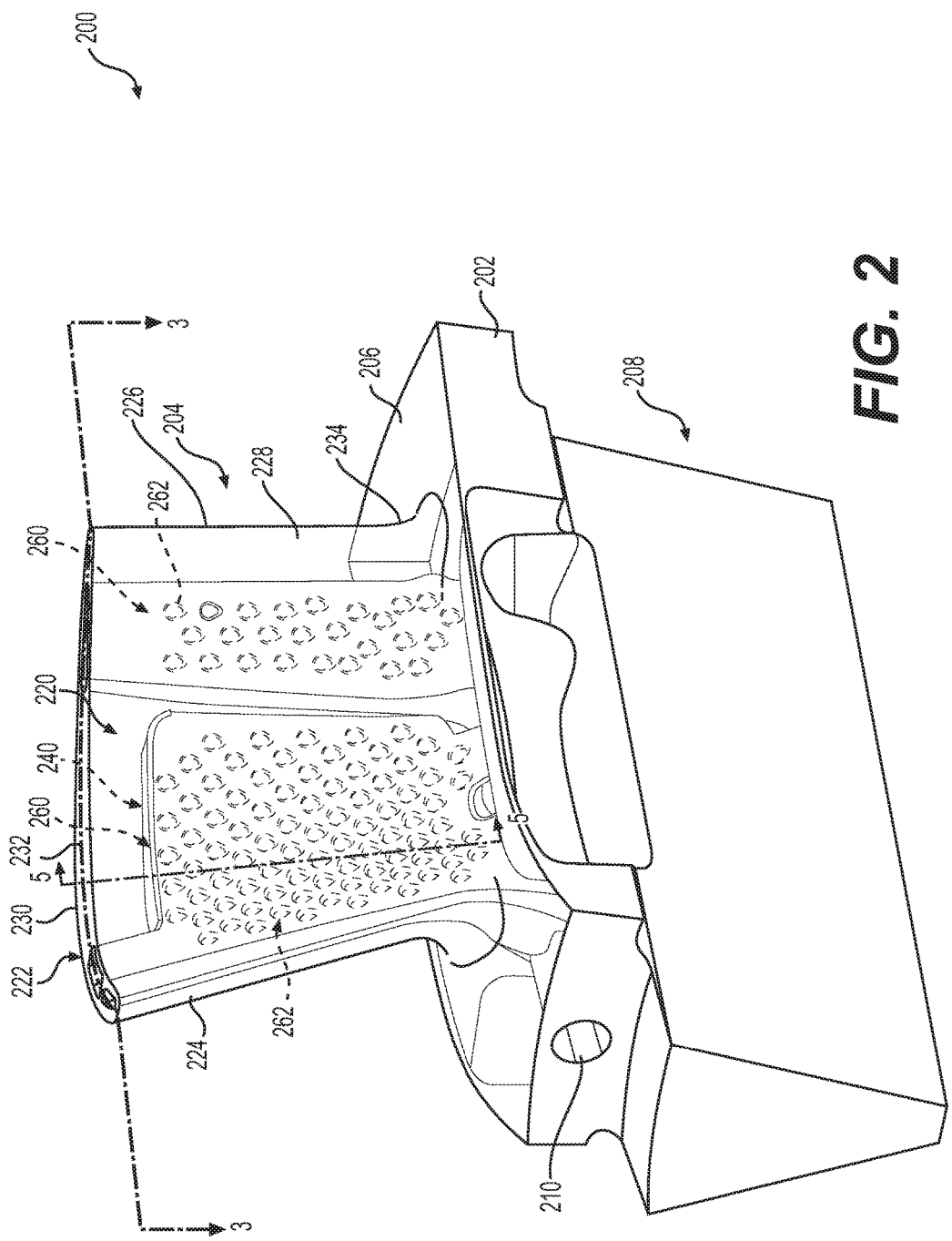
FIG. 2 is a perspective view of the turbine blade of FIG. 1, which includes the turbine airfoil having the plurality of the shaped cooling pins.

With reference to FIG. 2, one of the turbine blades 200 for use with one or more of the turbines 126, 128, and 130 of the gas turbine engine 100 is shown. In this example, the turbine blade 200 is associated with the high pressure turbine 126; however, the turbine blade 200 may be associated with the low pressure turbine 128 or the power turbine 130. In this example, the turbine blade 200 includes a shank 202, an airfoil 204, a platform 206 and a root 208. The shank 202 defines a cooling fluid inlet 210. The cooling fluid inlet 210 is in fluid communication with a source of a cooling fluid F, which in this example is a fraction of the compressed air that bypasses the combustor section 106 (FIG. 1). It should be noted that while the cooling fluid F is described herein as comprising compressed air, any suitable source of cooling fluid may be employed. The cooling fluid F received by the cooling fluid inlet 210 internally cools the turbine blade 200. In this example, with reference to FIG. 3, the cooling fluid inlet 210 directs the cooling fluid into a manifold 212. The manifold 212 is defined within the shank 202 and a portion of the root 208. The manifold 212 is fluidly coupled to the cooling fluid inlet 210 and the airfoil 204 to direct the cooling fluid F into the airfoil 204. It should be noted that the shape of the manifold 212 is merely exemplary.

With reference back to FIG. 2, the platform 206 is configured to radially contain turbine airflow. The root 208 provides an area in which a fir-tree may be machined (not shown). The fir-tree is used to attach the turbine blade 200 to a turbine rotor disc (not shown). It should be understood, however, that the shape of the root 208 is merely exemplary.

Figure 3:
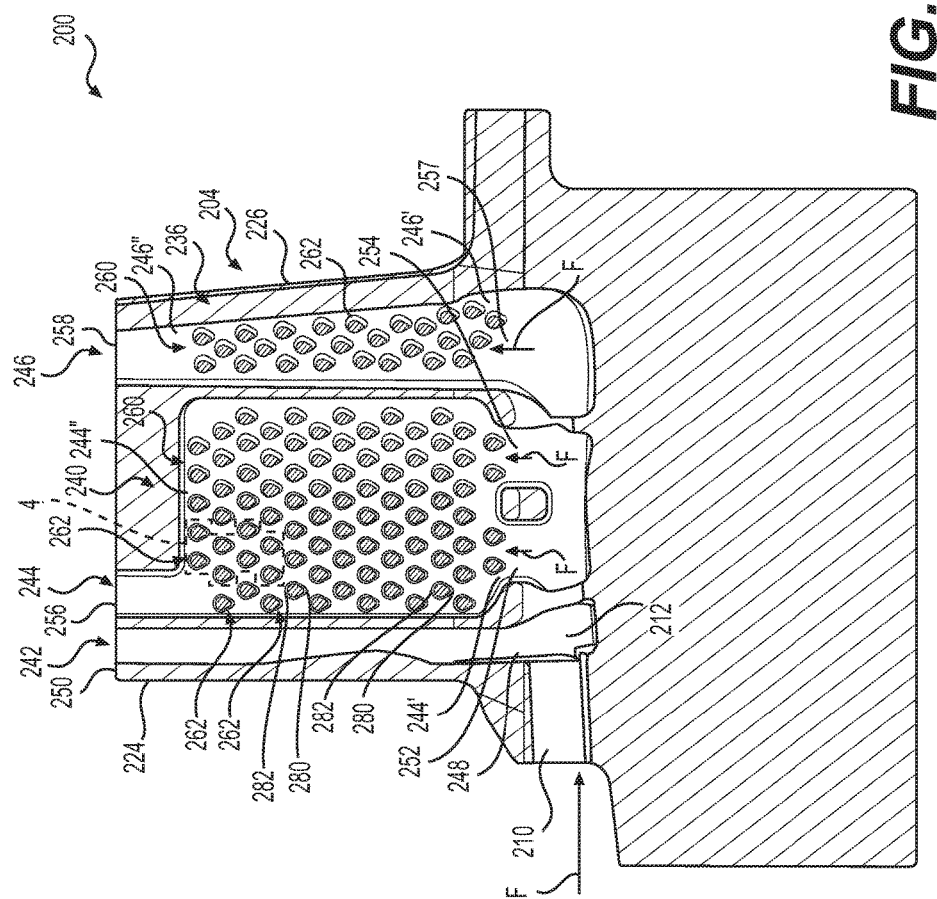
FIG. 3 is a cross-sectional view of the turbine blade of FIG. 1, taken along line 3-3 of FIG. 2, which illustrates the plurality of the shaped cooling pins of the turbine airfoil of the turbine blade of FIG. 2 in accordance with various teachings of the present disclosure.

The airfoil 204 has a first, concave outer wall 220 and a second, convex outer wall 222, each having outer surfaces that together define an airfoil shape. The airfoil 204 includes a leading edge 224, a trailing edge 226, a pressure side 228 along the first outer wall 220, a suction side 230 along the second outer wall 222, a blade tip 232 and an airfoil platform fillet 234. The airfoil 204 is coupled to the platform 206, and the airfoil platform fillet 234 surrounds the intersection between the airfoil 204 and the platform 206 to transition between the airfoil 204 and the platform 206. With reference to FIG. 3, an internal cooling circuit 240 is defined within an interior cavity 236 defined in the airfoil 204 between the first outer wall 220 and the second outer wall 222.

In this example, with continued reference to FIG. 3, the internal cooling circuit 240 includes a first cooling circuit 242, a second cooling circuit 244 and a third cooling circuit 246. The first cooling circuit 242 is defined along the leading edge 224, and extends from a first inlet 248 adjacent to and in fluid communication with the manifold 212 to a first tip ejector 250 at the blade tip 232. The first cooling circuit 242 directs a portion of the cooling fluid F from the manifold 212 along the leading edge 224 to cool the leading edge 224.

The second cooling circuit 244 is defined between the first cooling circuit 242 and the third cooling circuit 246. The second cooling circuit 244 extends from a second inlet 252 and a third inlet 254 each adjacent to and in fluid communication with the manifold 212 to a second tip ejector 256 at the blade tip 232. The second cooling circuit 244 directs a portion of the cooling fluid F from the manifold 212 between the first outer wall 220 and the second outer wall 222 to cool the pressure side 228 and the suction side 230, respectively. In this example, the second tip ejector 256 extends from the second cooling circuit 244 at the blade tip 232 near the first tip ejector 250 and does not span a full length of the second cooling circuit 244. It will be understood, however, that the second tip ejector 256 may extend over the full length of the second cooling circuit 244, if desired.

The third cooling circuit 246 directs a portion of the cooling fluid F along the trailing edge 226 to cool the trailing edge 226. The third cooling circuit 246 extends from a fourth inlet 257 adjacent to and in fluid communication with the manifold 212 to a third tip ejector 258. One or more of the first cooling circuit 242, the second cooling circuit 244 and the third cooling circuit 246 includes a cooling pin bank 260 or an array of shaped cooling pins 262.

In this example, the second cooling circuit 244 and the third cooling circuit 246 each include the cooling pin bank 260. In each of the second cooling circuit 244 and the third cooling circuit 246, the cooling pin bank 260 is defined within the respective one of the second cooling circuit 244 and the third cooling circuit 246 from an area adjacent to the manifold 212 to an area adjacent to the respective one of the second tip ejector 256 and the third tip ejector 258. Stated another way, the cooling pin bank 260 of each of the second cooling circuit 244 and the third cooling circuit 246 extends from a respective first end 244', 246' to a respective second end 244", 246" of the second cooling circuit 244 and the third cooling circuit 246, respectively. The cooling pin bank 260 enables heat transfer from the first outer wall 220 and the second outer wall 222 into the cooling fluid F that flows through the respective one of the second cooling circuit 244 and the third cooling circuit 246. The cooling pin bank 260 includes the plurality of shaped cooling pins 262. Each of the shaped cooling pins 262 are spaced apart and extend between the first outer wall 220 and the second outer wall 222 within the interior cavity 236 defined by the airfoil shape to enable heat transfer from the first outer wall 220 and the second outer wall 222 into the cooling fluid F. As will be discussed, the plurality of shaped cooling pins 262 are generally arranged in an array or pattern in each of the second cooling circuit 244 and the third cooling circuit 246 that defines the cooling pin bank 260.

Figure 4:
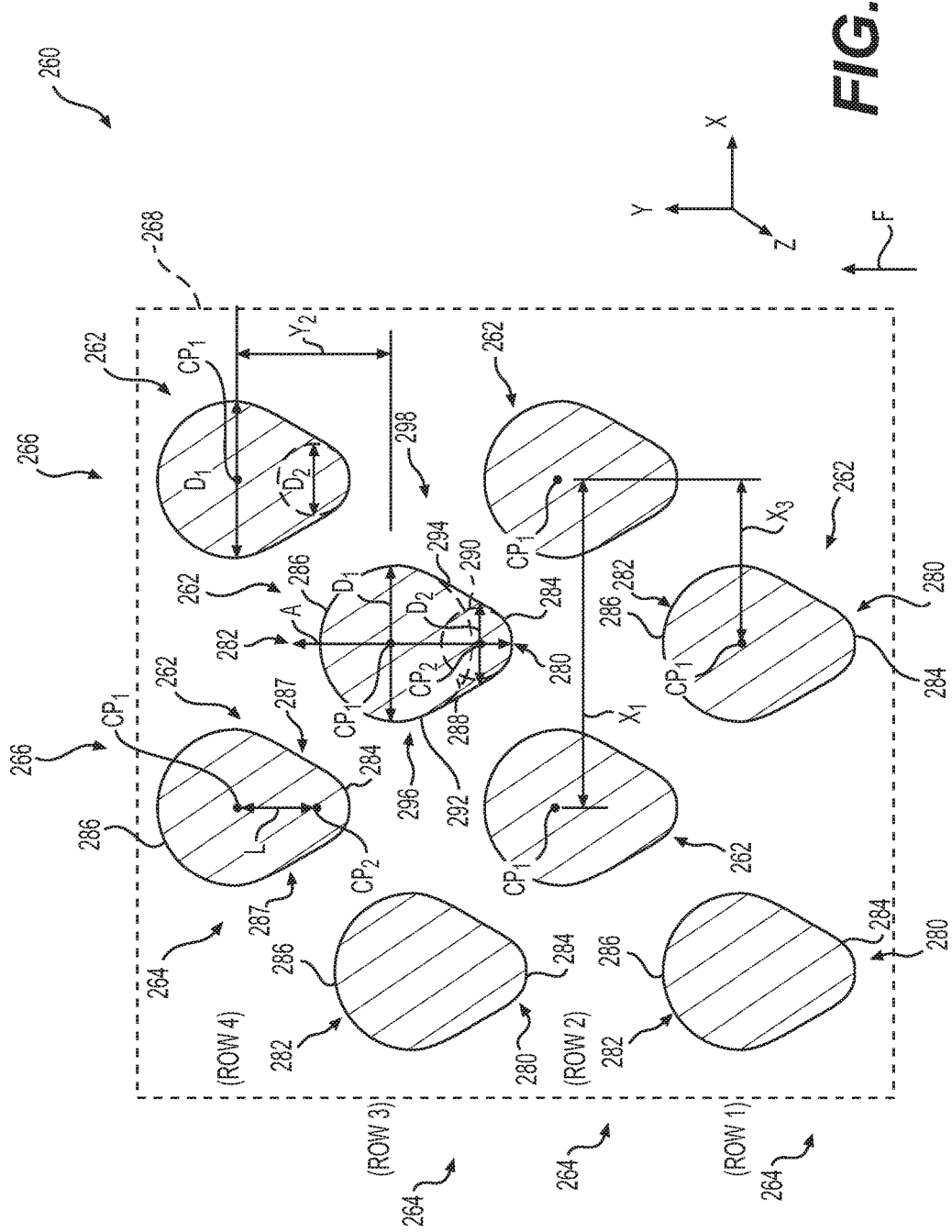
FIG. 4 is a detail view of the plurality of the shaped cooling pins of the turbine airfoil of FIG. 3, taken at 4 on FIG. 3.

With reference to FIG. 4, an exemplary portion of the cooling pin bank 260 is shown. In this example, the cooling pin bank 260 includes the plurality of shaped cooling pins 262 arranged in rows, generally identified by reference numeral 264, and columns, generally identified by reference numeral 266, to form a pattern 268. Stated another way, the pattern includes at least one row of a first sub-plurality of the plurality of shaped cooling pins 262 and at least one column of a second sub-plurality of the plurality of shaped cooling pins 262. In this example, the pattern 268 includes four rows 264 and three columns 266.

In one example, the plurality of shaped cooling pins 262 are spaced apart from each other in each row 264 in an X-direction by a first distance $X_1$. In this example, the first distance $X_1$ is measured from a first center point $CP_1$ of a major diameter $D_1$ of each adjacent shaped cooling pin 262. In one example, the first distance $X_1$ is about $(1.0 \times D_1)$ to about $(6.0 \times D_1)$. Stated another way, adjacent ones of the first sub-plurality of shaped cooling pins 262 in the respective row 264 are spaced apart by the first distance $X_1$ that is defined between the first center point $CP_1$ of each of the adjacent ones of the first sub-plurality of shaped cooling pins 262. It should be noted that while the plurality of shaped cooling pins 262 are described herein as forming a pattern, the plurality of shaped cooling pins 262 need not form a pattern, but rather may be positioned within the cooling circuit as desired to meet predefined cooling requirements for the turbine blade 200.

In this example, the rows 264 of the first plurality of shaped cooling pins 262 are spaced apart from each other in a Y-direction by a second distance $Y_2$. In this example, the second distance $Y_2$ is measured from a first center point $CP_1$ of a major diameter $D_1$ of each adjacent shaped cooling pin 262. In one example, the second distance $Y_2$ is about $(0.87 \times D_1)$ to about $(8.0 \times D_1)$. Thus, each shaped cooling pin 262 in the columns 266 of the first sub-plurality of the plurality of shaped cooling pins 262 is spaced apart by the first distance $X_1$ and each shaped cooling pin 262 in the rows 264 of the second sub-plurality of the plurality of shaped cooling pins 262 is spaced apart by the second distance $Y_2$, the first distance $X_1$ different than the second distance $Y_2$. Generally, the second distance $Y_2$ is less than the first distance $X_1$. In other embodiments, however, the second distance $Y_2$ may be equal to the first distance $X_1$.

In addition, the second plurality of shaped cooling pins 262 in the columns 266 are spaced apart from each other or staggered in the X-direction by a third distance $X_3$. In this example, the third distance $X_3$ is measured from the first center point $CP_1$ of the major diameter $D_1$ of each adjacent shaped cooling pin 262. Generally, third distance $X_3$ is less than the first distance $X_1$. In one example, the third distance $X_3$ is $X_1/2$. Thus, each shaped cooling pin 262 in the columns 266 of the second sub-plurality of the plurality of shaped cooling pins 262 is also spaced apart by the third distance $X_3$, the third distance $X_3$ different than the second distance $Y_2$ and the first distance $X_1$.

As can be appreciated, each of the plurality of shaped cooling pins 262 in the cooling pin bank 260 are the same, and thus, only one of the plurality of shaped cooling pins 262 will be described in detail herein. In this example, the shaped cooling pin 262 has a first end 280 and a second end 282 that extend along an axis A. The first end 280 is upstream from the second end 282 in the cooling fluid F. Stated another way, the first end 280 faces the manifold 212 (FIG. 3) so as to be positioned upstream in the cooling fluid F. The first end 280 has a first curved surface 284 defined by the minor diameter $D_2$, and the second end 282 has a second curved surface 286 defined by the major diameter $D_1$. The minor diameter $D_2$ is smaller than the major diameter $D_1$. In one example, the minor diameter $D_2$ is about 0.010 inches (in.) to about 0.050 inches (in.); and the major diameter $D_1$ is about 0.020 inches (in.) to about 0.100 inches (in.). The center of minor diameter $D_2$ is spaced apart from the center of major diameter $D_1$ by a length L. In one example, the length L is about 0.010 inches (in.) to about 0.150 inches (in.). The first curved surface 284 and the second curved surface 286 are interconnected by a pair of surfaces 287 that are defined by a pair of planes that are substantially tangent to a respective one of the first curved surface 284 and the second curved surface 286. It should be noted, however, that the first curved surface 284 and the second curved surface 286 need not be interconnected by a pair of planes that are substantially tangent to a respective one of the first curved surface 284 and the second curved surface 286. Rather, the first curved surface 284 and the second curved surface 286 may be interconnected by a pair of concave, convex, other shaped surfaces.

Generally, the shape of the shaped cooling pin 262 is defined in cross-section by a first circle 288, a second circle 290 and a pair of tangent lines 292, 294. In this example, the first circle 288 defines the first curved surface 284 at the first end 280 and has the minor diameter $D_2$. The second circle 290 defines the second curved surface 286 at the second end 282 and has the major diameter $D_1$. The first circle 288 includes the second center point $CP_2$, and the second circle 290 includes the first center point $CP_1$. The first center point $CP_1$ is spaced apart from the second center point $CP_2$ by the length L. The length L is greater than zero. Thus, the first curved surface 284 is spaced apart from the second curved surface 286 by the length L.

The tangent lines 292, 294 interconnect the first curved surface 284 and the second curved surface 286. Generally, the tangent line 292 touches the first curved surface 284 and the second curved surface 286 on a first side 296 of the shaped cooling pin 262. The tangent line 294 touches the first curved surface 284 and the second curved surface 286 on a second side 298 of the shaped cooling pin 262.

With reference to FIG. 2, the turbine blade 200 having the cooling pin bank 260 including the plurality of shaped cooling pins 262 may be cast as one-piece, from a suitable metal or metal alloy, such as MAR-M 247 equiaxed or directionally solidified, or from a single crystal material. In one example, the turbine blade 200 is formed using investment casting, and the fir-tree 209 is machined in a subsequent processing step. It should be noted that alternatively, the turbine blade 200 may be formed using conventional dies with one or more portions of a core (or portions adjacent to the core) comprising a fugitive core insert. Further, turbine blade 200 may be formed through additive manufacturing methods such as direct metal laser sintering.

With the turbine blade 200, including the airfoil 204 with the cooling pin bank 260 having the plurality of shaped cooling pins 262 formed, the fir-tree (FIG. 2) may be machined into the root 208. With the fir-tree machined into the root 208, the turbine blade 200 may be coupled to a turbine rotor disc. Generally, a plurality of the turbine blades 200 is assembled into the turbine rotor disc to form the high pressure turbine 126. With the high pressure turbine 126 assembled, the high pressure turbine 126 is coupled to or integral with the gas turbine engine 100.

When the gas turbine engine 100 is operating in certain operating environments, which include fine sand and dust, the fine sand and dust may be ingested by the gas turbine engine 100, via the fan section 102, for example. As the ingested fine sand and dust flows through the gas turbine engine 100, any of the fine sand and dust that is entrained in the cooling fluid F may flow into the internal cooling circuit 240 of the airfoil 204. Due to the shape of the plurality of shaped cooling pins 262, the accumulation of the fine sand and dust particles within the cooling pin bank 260 of the internal cooling circuit 240 is reduced. In this regard, the first curved surface 284 defines a stagnation region of the respective shaped cooling pin 262. By having the first curved surface 284 facing the direction of the flow of the cooling fluid F, any accumulation of the fine sand and dust particles is substantially along the stagnation region defined by first curved surface 284. As the first curved surface 284 has the minor diameter $D_2$, which is less than the major diameter $D_1$, the stagnation region is reduced, and thus, the accumulation of the fine sand and dust particles is reduced as compared to a cylindrical cooling pin. Thus, the first curved surface 284 of the shaped cooling pin 262 reduces a stagnation region of the cooling pin, thereby reducing an available surface area for the accumulation of fine sand and dust particles. In addition, any accumulation of the fine sand and dust particles on the first curved surface 284 results in about a 5 percent (%) reduction in heat transfer area, as compared to about a 50 percent (%) reduction in heat transfer area when a cylindrical cooling pin is employed.

Figure 5:
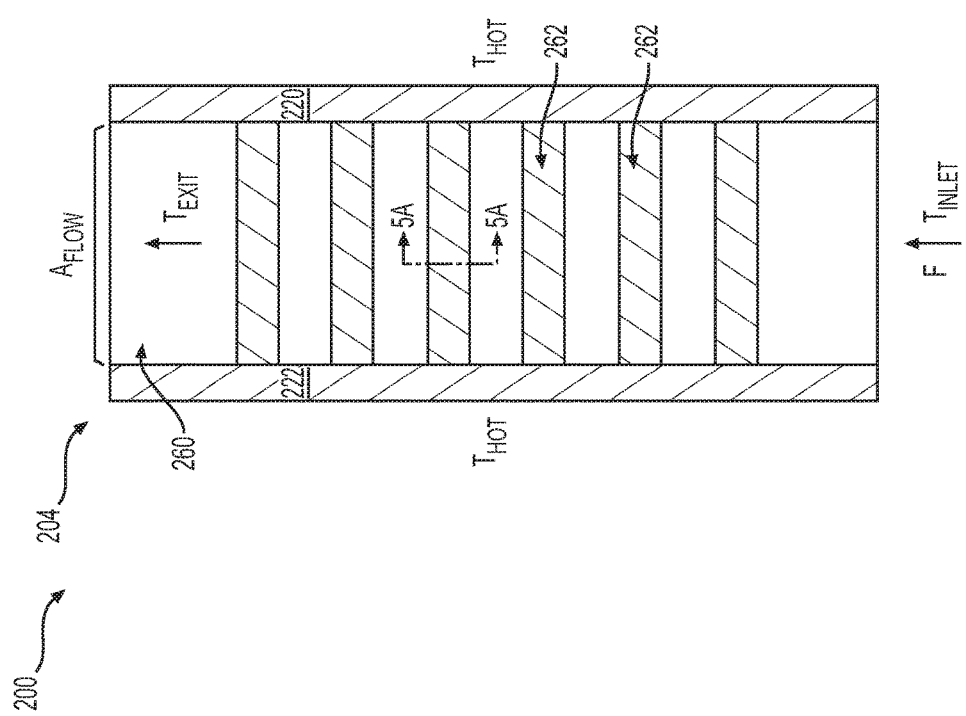
FIG. 5 is a cross-sectional schematic view of the plurality of the shaped cooling pins of the turbine airfoil of FIG. 2, taken along line 5-5 of FIG. 2, which illustrates cooling fluid flow through the cooling pin bank.

As a further example, the cooling pin bank 260 with the plurality of shaped cooling pins 262 is shown schematically in FIG. 5. In one example, the cooling effectiveness of the cooling pin bank 260 may be defined by two equations. First, equation (1), below relates to the temperature increase in the cooling fluid F as it passes through the cooling pin bank 260:

$$\epsilon_F = \frac{T_{exit} - T_{inlet}}{T_{hot} - T_{inlet}} \quad (1)$$

Wherein, $\epsilon_F$ is the effectiveness of the cooling fluid F as the cooling fluid F flows through the cooling pin bank 260; $T_{exit}$ is the exit temperature of the cooling fluid F in degrees Kelvin (K); $T_{inlet}$ is the inlet temperature of the cooling fluid F in degrees Kelvin (K); and $T_{hot}$ is the temperature of the working fluid in degrees Kelvin (K). It should be noted that the use of Kelvin (K) as the unit for the temperatures is merely exemplary.

Equation (2), below, relates to the temperature of the wall, such as the first outer wall 220 or the second outer wall 222:

$$\epsilon_M = \frac{T_{hot} - T_{wall}}{T_{hot} - T_{inlet}} \quad (2)$$

Wherein, $\epsilon_M$ is the effectiveness of the cooling fluid F in cooling the first outer wall 220 or the second outer wall 222 as the cooling fluid F flows through the cooling pin bank 260; $T_{hot}$ is the temperature of the working fluid in degrees Kelvin (K); $T_{wall}$ is the temperature of the first outer wall 220 or the second outer wall 222 in degrees Kelvin (K); and $T_{inlet}$ is the inlet temperature of the cooling fluid F in degrees Kelvin (K). It should be noted that the use of Kelvin (K) as the unit for the temperatures is merely exemplary.

Figure 5B:
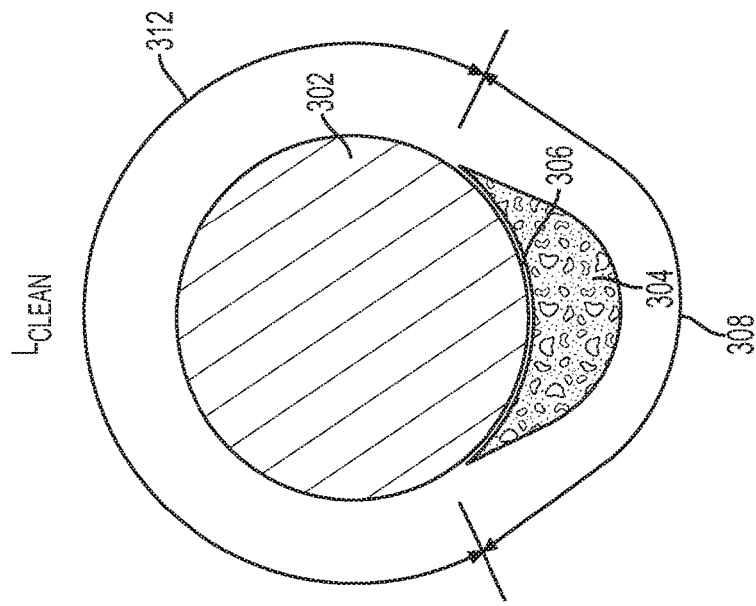
FIG. 5B is a cross-sectional schematic detail view of a cylindrical cooling pin, taken from the perspective of line 5A-5A of FIG. 5, which illustrates an accumulation of fine particles on the cylindrical cooling pin.
Figure 5A:
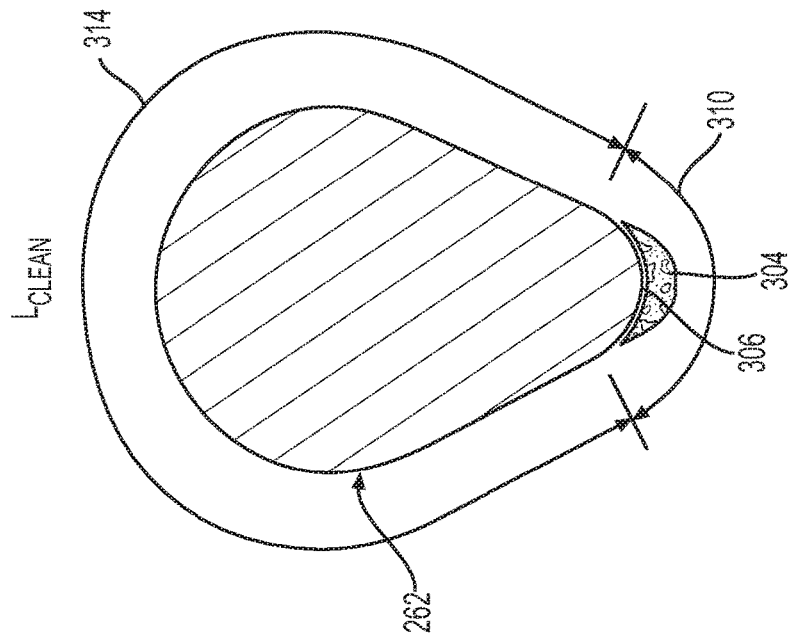
FIG. 5A is a cross-sectional schematic detail view of one of the plurality of the shaped cooling pins of the turbine airfoil of FIG. 3, taken along line 5A-5A of FIG. 5, which illustrates an accumulation of fine particles on the one of the plurality of the shaped cooling pins.

With reference to FIG. 5A, a cross-section of a "dirty" one of the plurality of shaped cooling pins 262 is shown, and a cross-section of a "dirty" cylindrical cooling pin 302 is shown in FIG. 5B. As shown in both FIGS. 5A and 5B, an accumulation of fine particles 304 is formed on a stagnation region 306 of each of the pins 262, 302. As shown, a perimeter 308 covered by the accumulation of fine particles 304 on the cylindrical pin 302 is different than, and greater than, a perimeter 310 covered by the accumulation of fine particles 304 on the one of the plurality of shaped cooling pins 262. As the cylindrical cooling pin 302 has a larger accumulation of fine particles 304, a remaining "clean" perimeter 312 of the cylindrical cooling pin 302 is different, and less than, a remaining "clean" perimeter 314 of the one of the plurality of shaped cooling pins 262. Thus, the plurality of shaped cooling pins 262, even when "dirty" has a clean surface area that is different from, and greater than, a clean surface area of the cylindrical cooling pin 302. The larger clean surface area of each of the plurality of shaped cooling pins 262 enables each of the plurality of shaped cooling pins 262 to be more effective in the transfer of heat from the first outer wall 220 or the second outer wall 222 to the cooling fluid F than the cylindrical cooling pin 302.

In this regard, a comparison of the heat transfer performance may be made that illustrates how the effectiveness may decrease as the pins 262, 302 accumulate the fine particles and become "dirty." For example, a cooling pin bank of the plurality of cylindrical pins 302 and the cooling pin bank 260 of the plurality of shaped pins 262 may be defined in a similar manner using the same basic size and spacing between rows and columns, cross sectional channel flow area, cooling flow F (rate and temperature), wall thickness, and the same external convection conditions. Based on the above equations (1) and (2), the plurality of cylindrical cooling pins 302 decrease in effectiveness $\epsilon_F$ by about 6.5 percent (%), when the plurality of cylindrical cooling pins 302 are clean and become "dirty;" and decrease in effectiveness $\epsilon_M$ by about 5.3 percent (%), when the plurality of cylindrical cooling pins 302 are clean and become "dirty." The plurality of shaped cooling pins 262 decrease in effectiveness $\epsilon_F$ by about 0.4 percent (%), when the plurality of shaped cooling pins 262 are clean and become "dirty;" and decrease in effectiveness $\epsilon_M$ by about 0.5 percent (%), when the plurality of shaped cooling pins 262 are clean and become "dirty."

Thus, when comparing the effectiveness $\epsilon_F$ between a "dirty" plurality of cylindrical cooling pins 302 and a "dirty" plurality of shaped cooling pins 262, the "dirty" plurality of shaped cooling pins 262 are about 2.5 percent (%) more effective than "dirty" the plurality of cylindrical cooling pins 302. Likewise, when comparing the effectiveness $\epsilon_M$ between the "dirty" plurality of cylindrical cooling pins 302 and "dirty" plurality of shaped cooling pins 262, the "dirty" plurality of shaped cooling pins 262 are about 3.7 percent (%) more effective than the "dirty" plurality of shaped cooling pins 262.

Accordingly, the plurality of shaped cooling pins 262 maintain the cooling of the airfoil 204 even during operating environments in which fine sand and dust may accumulate on the stagnation region of one or more of the plurality of shaped cooling pins 262. As the first curved surface 284 has the minor diameter $D_2$, which is less than the major diameter $D_1$, the stagnation region of each of the plurality of shaped cooling pins 262 is reduced, thereby reducing the accumulation of the fine sand and dust particles, which in turn, maintains the cooling of the airfoil 204 in these operating environments. Thus, the various teachings of the present disclosure provide a turbine component, such as the airfoil 204, which includes the plurality of shaped cooling pins 262.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine component, comprising:
   at least one cooling circuit defined within the turbine component, the at least one cooling circuit in fluid communication with a source of a cooling fluid; and
   at least one shaped cooling pin disposed in the at least one cooling circuit, the at least one shaped cooling pin having a first end and a second end extending along an axis, the first end having a first curved surface defined by a minor diameter and the second end having a second curved surface defined by a major diameter, the first curved surface is upstream in the cooling fluid and the minor diameter is less than the major diameter.

2. The turbine component of claim 1, wherein the first curved surface is spaced apart from the second curved surface by a length.

3. The turbine component of claim 1, wherein the first curved surface and the second curved surface are interconnected by a pair of surfaces defined by a pair of planes substantially tangent to a respective one of the first curved surface and the second curved surface.

4. The turbine component of claim 2, wherein, in cross-section, the second curved surface is defined by a first circle having a first center point and the first curved surface is defined by a second circle having a second center point, and the length is defined between the first center point and the second center point.

5. The turbine component of claim 4, wherein the at least one shaped cooling pin comprises a plurality of shaped cooling pins that are arranged in a pattern that includes at least one row of a first sub-plurality of the plurality of shaped cooling pins and at least one column of a second sub-plurality of the plurality of shaped cooling pins.

6. The turbine component of claim 5, wherein adjacent rows of the shaped cooling pins are spaced apart by a first distance that is defined between the first center point of each of the adjacent shaped cooling pins.

7. The turbine component of claim 6, wherein adjacent columns of the shaped cooling pins are spaced apart by a second distance that is defined between the first center point of each of the adjacent shaped cooling pins.

8. The turbine component of claim 7, wherein the second distance is less than the first distance.

9. The turbine component of claim 1, wherein the turbine component a turbine airfoil, and the turbine airfoil is coupled to a platform that defines an inlet that is in fluid communication with the source of cooling fluid, and the platform is coupled to a root, with the turbine airfoil, the platform and the root cooperating to form a turbine blade for a turbine of a gas turbine engine.

10. A turbine component, comprising:
    at least one cooling circuit defined within the turbine component, the at least one cooling circuit in fluid communication with a source of a cooling fluid; and
    a plurality of shaped cooling pins disposed in the at least one cooling circuit in a pattern that includes at least one row of a first sub-plurality of the plurality of shaped cooling pins and at least one column of a second sub-plurality of the plurality of shaped cooling pins, each of the at least one row of the shaped cooling pins spaced apart by a first distance, each of the at least one column of the shaped cooling pins spaced apart by a second distance, the first distance different than the second distance, and each of the plurality of shaped cooling pins having a first end and a second end extending along an axis, the first end having a first curved surface defined by a minor diameter and the second end having a second curved surface defined by a major diameter, the second curved surface is downstream from the first curved surface in the cooling fluid and the minor diameter is less than the major diameter.

11. The turbine component of claim 10, wherein the second distance is less than the first distance.

12. The turbine component of claim 10, wherein the first curved surface is spaced apart from the second curved surface by a length.

13. The turbine component of claim 10, wherein the first curved surface and the second curved surface are interconnected by a pair of surfaces defined by a pair of planes substantially tangent to a respective one of the first curved surface and the second curved surface.

14. The turbine component of claim 13, wherein, in cross-section, the second curved surface is defined by a first circle having a first center point and the first curved surface is defined by a second circle having a second center point, and the length is defined between the first center point and the second center point.

15. The turbine component of claim 14, wherein the first distance is defined between the first center point of adjacent shaped cooling pins of adjacent rows.

16. The turbine component of claim 14, wherein the second distance is defined between the first center point of adjacent shaped cooling pins of adjacent columns.

17. The turbine component of claim 10, wherein the turbine component is a turbine airfoil is coupled to a platform that defines an inlet that is in fluid communication with the source of cooling fluid, and the platform is coupled to a root, with the turbine airfoil, the platform and the root cooperating to form a turbine blade for a turbine of a gas turbine engine.

* * * * *